United States Patent [19]

LeBeck

[11] Patent Number: 5,174,944
[45] Date of Patent: Dec. 29, 1992

[54] APPARATUS FOR SEPARATING GAS FROM A LIQUID

[75] Inventor: Norman G. LeBeck, Milwaukee, Wis.

[73] Assignee: Waukee Engineering Company Inc., Milwaukee, Wis.

[21] Appl. No.: 438,778

[22] Filed: Nov. 17, 1989

[51] Int. Cl.⁵ .............................................. C21D 1/06
[52] U.S. Cl. ..................................... 266/22; 55/170; 55/274
[58] Field of Search ................. 55/170, 274; 266/253, 266/252

[56] References Cited

U.S. PATENT DOCUMENTS

| | | | |
|---|---|---|---|
| 1,255,018 | 1/1918 | Jones | 55/170 |
| 2,496,467 | 2/1950 | Griffith | 55/170 |
| 3,344,587 | 10/1967 | Wakeman | 55/170 |
| 4,279,406 | 7/1981 | Bourhis et al. | 266/252 |

Primary Examiner—Bernard Nozick
Attorney, Agent, or Firm—Andrus, Sceales, Starke & Sawall

[57] ABSTRACT

An apparatus is provided for separating nitrogen gas from methanol liquid in a furnace hardening system. The furnace is housed in a building and connected by a piping system to a methanol storage tank located outside the building. The tank is capped with nitrogen to pressurize the system at high pressure and a pressure regulator reduces the pressure at the furnace. A flowmeter unit controls the flow rate. The gas separating apparatus includes a vessel having a liquid inlet and a liquid outlet in the lower end. The methanol containing nitrogen is introduced under pressure into the inlet and is discharged from the outlet at a lesser flow rate to provide an accumulation of the liquid in the vessel, while the nitrogen gas is released from the liquid and collects in the headspace of the vessel. A float is disposed in the vessel and floats on the accumulated liquid in the lower end of the vessel. A switch mechanism is associated with the float and when accumulated gas lowers in liquid and float to a predetermined position, the switch mechanism acts to open a valve in a gas outlet to vent the nitrogen from the vessel to the atmosphere.

6 Claims, 1 Drawing Sheet

APPARATUS FOR SEPARATING GAS FROM A LIQUID

BACKGROUND OF THE INVENTION

In heating systems, such as a heat treating furnace using a liquid such as methanol for establishing a hardening atmosphere within the furnace, the methanol is delivered to the furnace by a pressurized nitrogen gas system. The nitrogen is generally stored outdoors and the tank is capped or pressurized with a high pressure nitrogen head. The pressure may be on the order of 45 psi or more. The methanol is passed through suitable indoor piping to the furnace. With a pressurized gas system, a portion of the nitrogen becomes entrained in the methanol and the entrained nitrogen has an adverse effect on the performance of flowmeters in the system. The gas accumulates as bubbles in the flowmeter causing the float of the flowmeter to move erratically and promoting erroneous flow readings. Gas bubbles can also have an adverse effect on the operation of valves in the system.

Therefore, there has been a need for a separator which will remove entrained gas or nitrogen from the liquid, while maintaining the pressurized condition of the liquid supply system.

SUMMARY OF THE INVENTION

The invention is directed to an apparatus for separating entrained gas from a liquid and has particular application for separating nitrogen from methanol in hardening furnaces and like fuel systems. In accordance with the invention, the apparatus includes a closed vessel having an inlet through which the pressurized liquid containing an entrained gas is introduced and having a liquid outlet in the lower end. The flow rate of liquid being discharged from the outlet is less than the flow rate of the liquid being introduced to the vessel through the inlet so that a volume of liquid will accumulate in the vessel. The inventor has found that notwithstanding the pressurized system, including the closed vessel, gas is released from the liquid, and particularly nitrogen within the liquid methanol, and accumulates in the headspace or upper end of the vessel.

A float unit is located within the vessel and floats on the accumulated volume of liquid. Associated with the float is a switch mechanism, and when the float is lowered in the vessel to a predetermined position, due to the accumulation of a selected level of the released gaseous medium in the headspace, the switch mechanism acts to open a valve mounted in an opening in the upper end of the vessel to vent gas from the vessel.

The apparatus of the invention serves to remove the entrained gas, such as nitrogen, from the liquid, such as methanol, while maintaining the pressurized conditions in the system.

The apparatus provides a simple and compact unit for removing the gas from the liquid.

Other objects and advantages will appear in the course of the following description.

DESCRIPTION OF THE DRAWING

The drawing illustrates the best mode presently contemplated of carrying out the invention.

In the drawing.

DESCRIPTION OF THE ILLUSTRATED EMBODIMENT

Figures 1, 2, 3:
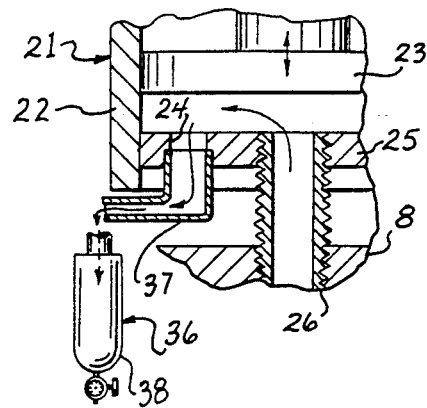
FIG. 1 is a diagrammatic view of a supply system for a work hardening furnace, including a gas separating apparatus, shown enlarged and in longitudinal section, and disclosing a structure in accordance with the invention.
FIG. 2 is an enlarged longitudinal section of the valve.
FIG. 3 is a transverse section taken along line 3—3 of FIG. 1.

The drawing shows a hardening furnace system including an apparatus for separating an entrained gas from a liquid and has particular application for removing nitrogen gas from liquid methanol. The apparatus includes a closed housing 1 which defines a chamber 2. The liquid, containing in entrained gas is introduced to chamber 2 through line 3, which is connected to inlet 4. A suitable filter 5 can be connected in line 3.

The liquid entering the vessel or housing 1 is at a pressure generally in the range of 10 to 15 psi and the liquid will flow downwardly along the walls of the housing 1 and accumulate in chamber 2. The gas is released from the liquid in chamber 2 and accumulates in the upper end or headspace of the chamber.

Located in the lower end of housing 1 is a liquid outlet 6 which is connected to discharge line 7. Lines 3 and 7 are constructed such that the flow rate of liquid entering vessel 1 through line 3 is greater than the flow rate of liquid being discharged through line 7, so that the liquid will accumulate in chamber 2.

The open upper end of housing 1 is enclosed by a cap 8, which is threaded within the upper end of the housing. Tube 9 is secured to the lower surface of cap 8 and the lower end of tube 9 is connected by a threaded coupling 10 to tube 11, which extends downwardly within chamber 2. A nut 12 is secured to tube 11 and aids in threading the upper end of tube 11 in coupling 10.

As shown in FIG. 1, the lower end of tube 11 carries a base 13 which is adapted to rest on lower cap 14 which is threaded within the lower end of housing 1. Coupling 10 provides an adjustment so that base 13 can engage cap 14 when caps 8 and 14 are threaded within the respective ends of housing 1.

Mounted within chamber 2 is a float 15 which is preferably made of a plastic material and is generally annular in shape. Float 15 includes an outer cylindrical wall 16, an inner cylindrical wall 17, and the ends of walls 16 and 17 are enclosed by heads 18 and 19, respectively. Heads 18 and 19 are generally flat and extend normal to the axis of tube 11. The central opening in float 15 receives tube 11, so that the float can move vertically within chamber 2 in accordance with the liquid level.

Cap 8 is provided with a longitudinal passage 20, the inner end of which communicates with the interior of chamber 2. Connected to the outer end of passage 20 is a solenoid operated valve assembly 21. Valve assembly 21 is composed of an outer generally cylindrical housing 22 and a valve 23 is mounted for sliding movement within housing 22 and is adapted to open and close a plurality of ports 24 which are spaced circumferentially around the axis of the valve and are located in the end wall 25 of the valve.

End wall 25 is also provided with a central opening which is connected via a threaded nipple 26 to the upper end of passage 20.

A pair of electrical leads 27 are connected to the solenoid, not shown, of valve assembly 21 and leads 27 extend downwardly through a central opening 28 in cap 8, then through the interior of tube 9, through an opening in the closed upper end of tube 11 and are connected to a switch mechanism that is associated with float 15. Leads 27 can be suitably sealed or potted within the openings and in cap 8 and tube 11, respectively.

The switch mechanism is a conventional type which is adapted to generate an electrical signal when the float has been lowered to a predetermined position by an increase of gas pressure in the headspace of chamber 2. The switch can include a magnetic switch contact 29 which is mounted in the interior of float 15 on the outer surface of inner wall 17 and a second magnetic switch contact which is mounted to the inner surface of tube 11. When switch contact 29 on float 15 comes in proximate radial relation with the switch contact 29a on tube 11, an electrical signal will be generated to open valve 23 to permit the gas in the headspace of chamber 2 to exit through passage 20 and ports 24.

The illustrated embodiment of the invention is shown forming a part of a typical system shown diagrammatically for operating a hardening furnace 25 within which a hardening atmosphere is created by controlled delivery of methanol and nitrogen. The methanol is stored in a large storage tank 26, generally outside of the work building 27. A nitrogen head 28 is maintained within the capped tank 26 to pressurize the methanol and the piping system 29 to the furnace 25. The nitrogen head 28 establishes a pressure typically in the range of 45 to 55 psi. A pressure regulator 30 is connected in the piping system 29 to reduce the pressure of the methanol supplied to the filter 5 and thereby furnace 25 at a much lower pressure, and typically 10 to 15 psi. The gas release chamber 2 is connected to the discharge or downstream side of the regulator 30 and thus operation at the relatively low-pressure level. In accordance with known practice, a flow restrictor unit 3 is connected downstream of the chamber 2 to establish the proper flow rate to the furnace 25 to produce the desired hardening atmosphere. The pressure difference between the upstream end of the chamber 2 and the downstream side of the flow restrictor 31 is minimal and the desired flow is established through the pressurized system to establish and hold the proper atmosphere within the furnace 25. A flowmeter unit 32 is provided to regulate and maintain a precise flow rate of the methanol to the furnace. The flowmeter is preferably constructed as shown in U.S. Pat. No. 4,864,870 which issued on Sep. 12, 1989, and includes a float-unit 33 between the flow passage 34 and a readout chamber 35 defining a float-operated readout system. The readout chamber 35 establishes an electrical control coupled to the flow rate control unit 31 to establish and maintain a selected supply of methanol to the furnace. Nitrogen is also supplied under a controlled flow unit, not shown. The float-unit 33 is positioned in accordance with the flow rate of the liquid through the flowmeter passageway 34. The readout chamber 35 communicates with the flow chamber as passageway 34 and is filled with the same liquid. The flowmeter 34 and readout chamber 35 must be maintained filled with the flowing liquid. If air or other gas bubbles such as nitrogen enters the flowmeter and engage the float-unit 33 as in the readout chamber 35, a gas bubble may engage the float and particularly the readout disc, establishing an erroneous positioning of float-unit 33. A bubble engaging the float has been found to indicate an improper flow rate, and may actually drive the flow control valve, not shown, to a fully open position establishing an undesirable atmosphere in the furnace at the best condition, and a hazardous atmosphere at the worst condition. Thus, elimination of the nitrogen is significant.

The present invention provides a gas release unit to remove the nitrogen, or other gaseous materials, within the pressurized methanol liquid and produce degassed liquid flow to the flowmeter unit 32, and thereby establish an effective supply of methanol to the furnace.

Methanol is of course a highly volatile product and care is required to prevent loss thereof in the environment of the furnace, which would otherwise create a highly hazardous condition. Thus the vessel and housing must be appropriately constructed to avoid leakage from the sealed structure including the solenoid valve structure 23 further, opening of the solenoid valve 23 opens chamber 2 and thus provides a possible path for escape of methanol. As the gas release structure is typically and advantageously provided immediately adjacent or near the furnace 25, a special by-pass system 36, shown as a sealed tube 37, from the solenoid valve 23 to a trap 38, may advantageously be provided to avoid the possible discharge of methanol to the surrounding environment.

In operation of the gas release unit, the liquid containing entrained gas, such as methanol containing nitrogen gas, is continually introduced at a pressure generally in the range of 10 to 15 psi into inlet 4 and the liquid will flow downwardly into the chamber 2 and accumulate within the chamber, while the entrained gas will be released and accumulate in the upper end of headspace of chamber 2.

At the start of operation, valve 23 will be open and as the float rises with an accumulation of liquid, the switch mechanism will be actuated to close the valve and prevent the venting of gas from chamber 2.

The float 15 may continue to rise in chamber 2 due to an increase in volume of liquid and establish a balance of liquid flow into and from the chamber. As the methanol liquid flows into chamber 2, the inventor has found the nitrogen within the methanol is released and rises into chamber 2. The accumulating gases displace the liquid and reduces the liquid level. The float moves downwardly in accordance with the gas accumulation and at a predetermined level and float position, switch contact 29 will move into proximate relation with the switch contact 30 on tube 11 to thereby open valve 23 and permit the gas in the upper end of the chamber to be vented through passage 20 and ports 24 to the exterior.

With the apparatus of the invention, the entrained gas is separated from the liquid and vented from the chamber while maintaining the pressure in the system. The apparatus is of simple and compact construction and yet provides for removal of the nitrogen or other gas.

While the above description has shown the invention particularly in a hardening furnace for removing the pressurizing nitrogen gas from the nitrogen capped and pressurized methanol metering system to produce a unique and an improved methanol feed system, it is contemplated that the invention can be in its broadest respect, used for separating a wide variety of gases from pressurized liquids in a pressurized flow system.

Various modes of carrying out the invention are contemplated as being within the scope of the following claims particularly pointing out and distinctly claiming the subject matter which is regarded as the invention.

I claim:

1. A methanol and nitrogen charged hardened furnace system including a furnace located within a heated building in combination with a liquid methanol supply tank for supplying liquid methanol to said furnace and said tank being pressurized with nitrogen and connected to said furnace by a piping system from said tank through said building to said furnace, comprising a high pressure flow line from said pressurized methanol tank passing through said building to immediately adjacent said furnace, said pressurized methanol tank including nitrogen from said pressurized nitrogen, a pressure regulator connected to said high pressure line and establishing a low pressure output flow line, a methanol gas debubbler unit connected to said low pressure line and having antigen degassed methanol output line, a flowmeter connected to said debubbler connected to said low pressure line and having a flow-positioned float member positioned within a flow passageway in accordance with the flow rate through said meter, said meter having a readout unit coupled to said flow chamber communicating with said flow passageway with said float extending downwardly into said float chamber, said piping system including a low pressure line connecting the output of said flowmeter to said furnace and including means for adjusting the flow of methanol to said furnace in accordance with the output of said flow meter, said debubbler unit including a sealed housing having an inlet passage connector connected to said pressure regulator and a bottom liquid outlet connected to said flowmeter whereby said sealed housing establishes a pressurized chamber for transfer of methanol to said flowmeter, said inlet passage connector and said bottom liquid outlet are constructed and arranged such that the flow of liquid into said sealed housing is selectively greater than the flow through said liquid outlet to thereby enable said bottom liquid to accumulate in said vessel, and said sealed housing having a gas release unit including a gas outlet connected to the upper end portion of the housing above said inlet passage connector, said housing accumulating liquid methanol in the bottom portion of the housing, nitrogen gas in said methanol being released in gaseous form and accumulating as nitrogen gas within the upper end portion of said housing, and an operating unit coupled to said gas release unit and nitrogen gas within said pressurized housing and responsive to a selected accumulation of said nitrogen gas and lowering of the level of methanol to actuate said gas release unit for a momentary period to release said pressurized accumulated nitrogen gas through said gas outlet from said pressurized chamber.

2. The furnace system of claim 1, wherein said methanol operating unit tank is mounted outside said building.

3. The furnace system of claim 1, wherein said operating unit coupled to said liquid methanol in said sealed housing includes a float responsive to the level of said liquid methanol, a proximity switch coupled to said float and operable to establish a closed circuit with said float positioned by said liquid methanol level below a selected minimum operating level and to establish an open circuit in all other float positions with said float in all other, said operating unit including an electrical operator for actuating of said gas release unit for releasing of said nitrogen gas, circuit means including a power supply and said proximity switch and said operating unit for selectively energizing said operating unit to release accumulated nitrogen gas from within said sealed housing.

4. The system of claim 1, wherein operating unit actuates said gas release unit vents said sealed housing for a momentary period of seconds.

5. The system of claim 1, wherein said housing is formed with an open top, a cap is secured to seal the upper end of said vessel, said cap having a gas outlet passage communicating with said chamber, said gas release unit includes a valve means associated with said passage for opening and closing said passage, san electrical operating for said valve means, support means secured to said cap and extending longitudinally downwardly in said housing, said means coupled to said gas includes an annular float means slidably disposed on said support means and constructed and arranged to float on the accumulated liquid in said vessel and thereby positioned in accordance with the volume of said nitrogen, and a first switch element associated with said float means, a second element on said support and connected in circuit with said switch being constructed and arranged to open said valve means in response to alignment of said first switch element on said float means with said second switch element whereby said valve means is opened to release nitrogen gas by a given accumulation of nitrogen gas in said upper end of said sealed housing and to immediately close said valve means in response to the float moving upwardly upon said gas release and accumulating of liquid methanol.

6. The apparatus of claim 5, wherein said float means includes an upper surface that in substantially flat and disposed normal to the axis of said support means and said switch element is located adjacent said upper surface.

* * * * *

UNITED STATES PATENT AND TRADEMARK OFFICE
CERTIFICATE OF CORRECTION

PATENT NO. : 5,174,944
DATED : December 29, 1992
INVENTOR(S) : NORMAN G. LEBECK

It is certified that error appears in the above-indentified patent and that said Letters Patent is hereby corrected as shown below:

Claim 5, column 6, line 28, delete "san" and substitute therefor ---an---; Claim 6, column 6, line 48, delete "in" and substitute therefor ---is---.

Signed and Sealed this

Second Day of August, 1994

Attest:

BRUCE LEHMAN

Attesting Officer

Commissioner of Patents and Trademarks